(12) United States Patent
Fukumoto et al.

(10) Patent No.: US 6,677,524 B2
(45) Date of Patent: Jan. 13, 2004

(54) GROMMET APPARATUS

(75) Inventors: Ryoichi Fukumoto, Nagoya (JP);
Nobuhiro Yamauchi, Chiryu (JP);
Katsuhisa Yamada, Toyota (JP);
Yasuhiro Yamakawa, Toyohashi (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/279,065

(22) Filed: Oct. 24, 2002

(65) Prior Publication Data
US 2003/0084538 A1 May 8, 2003

(30) Foreign Application Priority Data
Oct. 24, 2001 (JP) ........................................ 2001-326781

(51) Int. Cl.$^7$ ................................................. H02G 3/18
(52) U.S. Cl. ............... 174/65 G; 174/65 R; 174/65 SS; 16/2.1; 248/56
(58) Field of Search ............................. 174/65 G, 65 R, 174/65 SS, 152 G, 153 G, 135, 151, 68.1; 16/2.1, 2.2; 248/56

(56) References Cited
U.S. PATENT DOCUMENTS

| | | | | | |
|---|---|---|---|---|---|
| 4,656,689 | A | * | 4/1987 | Dennis | ........................ 16/2.2 |
| 6,150,608 | A | * | 11/2000 | Wambeke et al. | ........ 174/65 G |
| 6,218,625 | B1 | * | 4/2001 | Pulaski | .................... 174/153 G |
| 6,479,748 | B2 | * | 11/2002 | Mori | ........................ 174/65 G |
| 6,573,450 | B2 | * | 6/2003 | Saito et al. | ................ 174/65 G |
| 6,593,529 | B2 | * | 7/2003 | Nakata et al. | ............ 174/65 G |

FOREIGN PATENT DOCUMENTS

JP          11-127527 A          5/1999

* cited by examiner

Primary Examiner—Dhiru R Patel
(74) Attorney, Agent, or Firm—Burns, Doane, Swecker & Mathis, LLP

(57) ABSTRACT

A grommet apparatus includes wire, a hard grommet having a tubular wall portion contacted with the wire, a base portion contacted with the wire and a flexible engaging portion formed on the tubular wall portion and engaged with an opening, and a soft grommet having a surrounding portion surrounding the hard grommet, a first seal portion extended from the surrounding portion and fluid-tightly contacted with a surface of the panel, a wire fitting portion fitted onto the wire and a second seal portion fitted between the opening and the hard grommet.

1 Claim, 5 Drawing Sheets

GROMMET APPARATUS

The present application is based on and claims priority under 35 U.S.C §119 with respect to Japanese Patent application No. 2001-326781 filed on Oct. 24, 2001, the entire content of which is incorporated herein by reference.

FIELD OF THE INVENTION

The present invention relates to a grommet apparatus and more particularly to a grommet apparatus for holding a wire which goes through an opening of a panel of a vehicle and so on.

BACKGROUND OF THE INVENTION

Recently, a large variety of devices or parts are equipped in a vehicle and based on this, a plurality of wires for transmitting the electricity or the mechanical driving force are disposed in the vehicle. At a portion in which these wires go through an opening a panel of the vehicle, a grommet apparatus is used for protecting the wire or for preventing rain water from getting in through the opening. A conventional grommet apparatus of this kind is disclosed, for example, in Japanese Laid-open Publication No.11-127527. As shown in FIG. 5, this grommet apparatus 80 includes a wire 81, a hard grommet 85 having a tubular wall 82, a base portion 92 and a flexible engaging portion 84 and a soft grommet 90 having a surrounding portion 87, a first seal portion 88 and a wire fitting portion 89. The tubular wall 82 and the base portion 92 contact with the wire 81. The flexible engaging portion 84 is formed on the tubular wall 82 and is engaged with a penetrating hole of a panel 83. The surrounding portion 87 surrounds the hard grommet 85. The first seal member 88 is extended from the surrounding portion 87 and is fluid-tightly contacted with the surface of the panel 83. The wire fitting portion 89 is fitted onto the wire 81.

In case of that the wire 81 transmits the driving force from a driving source such as a motor and so on, there is a case that the wire 81 swings in regard to the panel 83. In this case, since there is a clearance 91 between the hard grommet 85 and the panel 83 in the grommet apparatus 80, there is a possibility that the grommet apparatus 80 jounces in regard to the panel 83. If the jouncing movement of the grommet apparatus 80 is large, there is in danger that the sealing performance of the grommet apparatus 80 in regard to the panel 93 is decreased.

SUMMARY OF THE INVENTION

It is, therefore, a principal object of the present invention to provide an improved grommet apparatus which overcomes the above drawback.

In order to attain the foregoing object, the present invention provides a grommet apparatus which includes a wire, a hard grommet having a having a tubular wall portion contacted with the wire, a base portion contacted with the wire and a flexible engaging portion formed on the tubular wall portion and engaged with an opening, and a soft grommet having a surrounding portion surrounding the hard grommet, a first seal portion extended from the surrounding portion and fluid-tightly contacted with a surface of the panel, a wire fitting portion fitted onto the wire and a second seal portion fitted between the opening and the hard grommet.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which.

DETAILED DESCRIPTION OF THE PRESENT INVENTION

Figure 1:
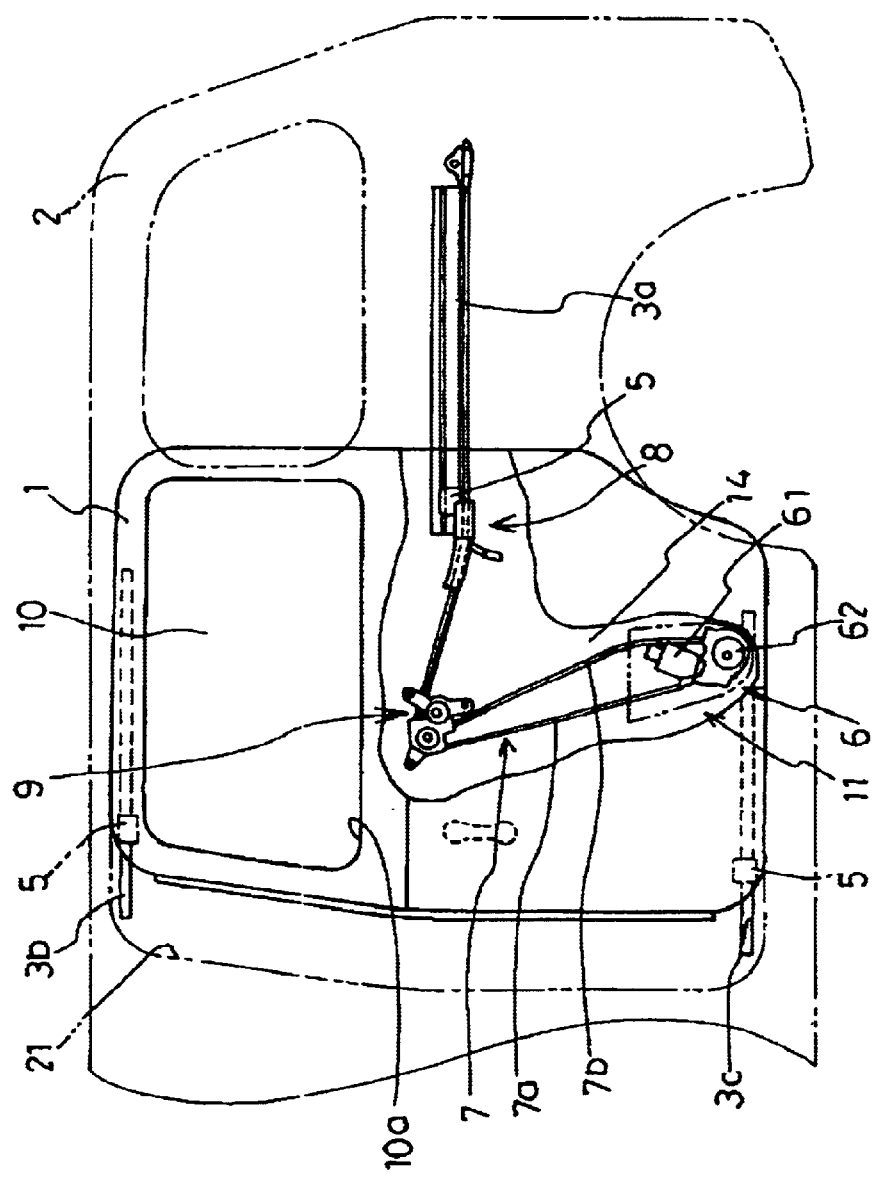
FIG. 1 is a side view of a vehicle in which a grommet apparatus according to an embodiment of the present invention is applied to a slide door device.

A grommet apparatus in accordance with a preferred embodiment of the present invention will be described with reference to attached drawings. In this embodiment, the present invention is applied to a power sliding mechanism of a slide door device of a vehicle. As shown in FIG. 1, a slide door 1 opens and closes a rectangular door opening 21 formed on a side body 2 of a vehicle. The slide door 1 is supported through a center guide rail 3a, an upper rail 3b and a lower guide rail 3c which are extended in the back and forth direction so as to be able to slide. The slide door 1 slides along the guide rails 3a, 3b and 3c.

Guide roller units 5 which are slidably guided on the guide rails 3a, 3b and 3c are supported on the slide door 1, respectively. The slide door 1 is guided on the guide rails 3a, 3b and 3c when the guide roller units 5 slide in regard to the guide rails 3a, 3b and 3c. As shown in FIG. 1, the driving force of a driving mechanism 6 is transmitted to the slide door 1 through the wire 7 and a sliding movement of the slide door 1 is performed.

Figure 2:
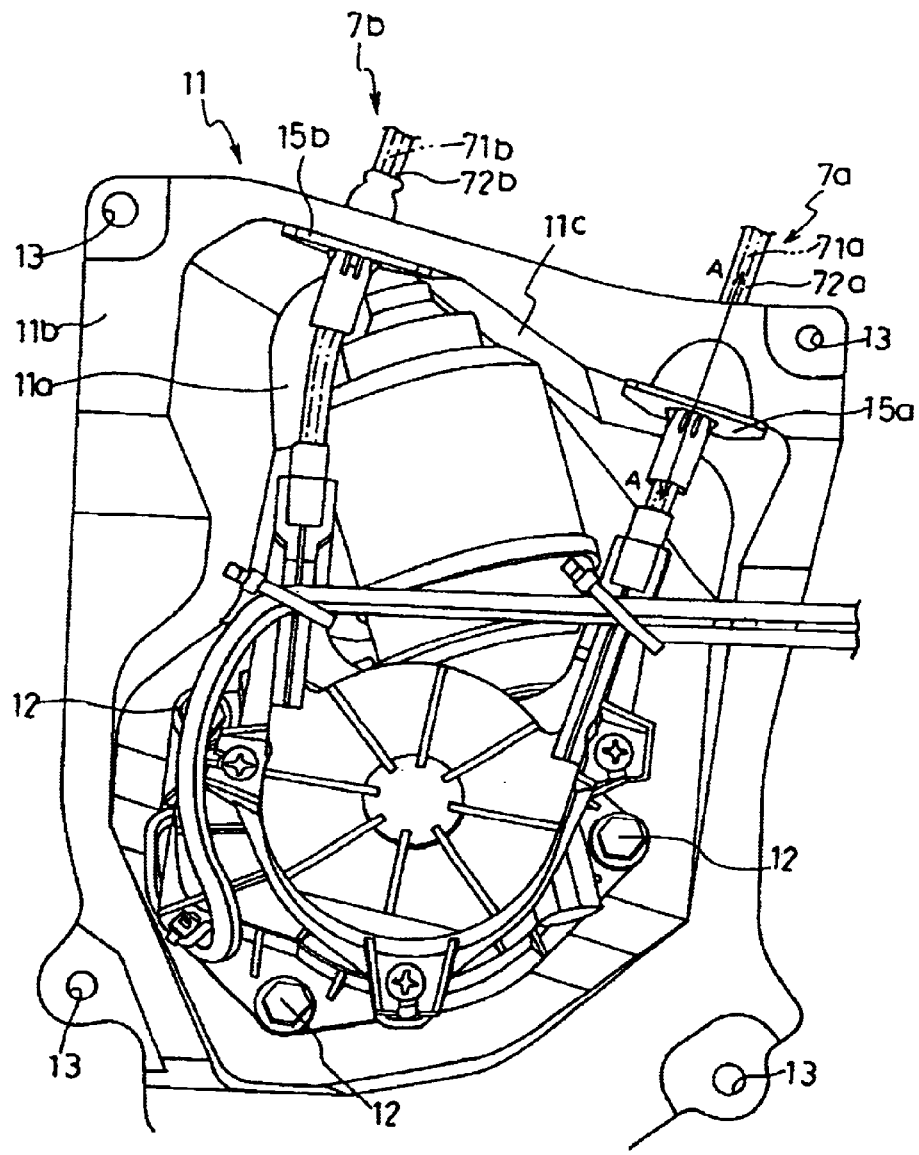
FIG. 2 is a side view of a driving mechanism of a slide door device to which a grommet apparatus according to an embodiment of the present invention is applied.

As shown in FIG. 1 and FIG. 2, the driving mechanism 6 is disposed in the slide door 1 and is fixed to an inner door panel 14 of the slide door 1 through a bracket 11. The driving mechanism 6 includes a motor 61 as a driving source and an output drum 62 which is able to rotate. The output drum 62 is connected to an output shaft of the motor 61 through a reduction gear mechanism (not shown) and rotates in one direction and in the other direction by the normal rotation and reverse rotation of the motor 61.

The wire 7 includes two wires 7a, 7b. The wire 7a includes an inner cable 71a made of metal and a casing surrounding the inner cable 71a and made of resin. One end of the inner cable 71a is engaged with the output drum 62 and is wound on the output drum 62. The inner cable 71a is guided by an intermediate pulley mechanism 9 and a movable pulley mechanism 8 in the slide door 1 and is disposed in the center guide rail 3a. The other end (not shown) of the inner cable 71a is engaged with a neighborhood of a front end of the center guide rail 3a in the back and forth direction of the vehicle. The casing 72a surrounds a portion of the inner cable 71a which is located between the output drum 62 and the intermediate pulley mechanism 9 and between the intermediate pulley mechanism 9 and the movable pulley mechanism 8. On the other hand, the wire 7b includes an inner cable 71b made of metal and a casing made of resin. One end of the inner cable 71b is engaged with the output drum 62 and is wound on the output drum 62. The inner cable 71b s guided by an intermediate pulley mechanism 9 and a movable pulley mechanism 8 in the slide door 1 and is disposed in the center guide rail 3a. The other end (not shown) of the inner cable 71b is engaged with a neighborhood of a front end of the center guide rail 3a in the back and forth direction of the vehicle. The casing 72b surrounds a portion of the inner cable 71b which is located between the output drum 62 and the intermediate pulley mechanism 9 and between the intermediate pulley mechanism 9 and the movable pulley mechanism 8.

As mentioned above, the driving mechanism 6 is fixed to the inner door panel 14 in the slide door 1 through the bracket 11. FIG. 2 is a side view of the driving mechanism which is seen from the viewpoint inside of a passenger room. As shown in FIG. 2, the bracket 11 includes a driving mechanism mounting portion 11a and a door panel mounting portion 11b. An upper step portion 11c (panel) which is bent and extended toward the inside of the vehicle is formed at the upper portion of the driving mechanism mounting portion 11a. Further, the upper step portion 11c is bent upward of the vehicle and the door panel mounting portion 11b is extended. Namely, the bracket 11 has the driving mechanism mounting portion 11a which is concaved outward of the vehicle at its upper portion. The driving mechanism 6 is fixed to the driving mechanism mounting portion 11a by three bolts 12. Four mounting holes 13 are formed at four corners of the door panel mounting portion 11b. Four bolts (not shown) are fastened to the mounting holes 13 and the bracket 11 is fixed to the door panel 14.

Figure 3:
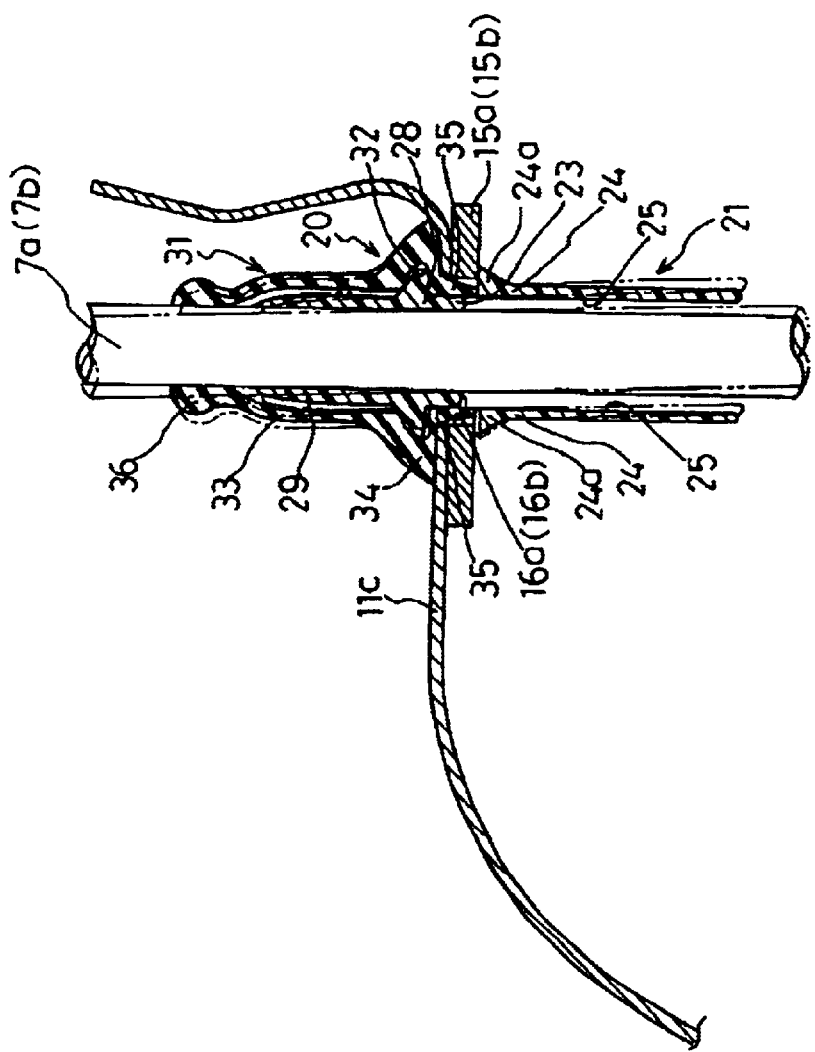
FIG. 3 is a cross-sectional view taken on line A—A of FIG. 2.

As shown in FIGS. 2 and 3, two reinforcing plates 15a, 15b are fixed to the upper step portion 11c by welding. Penetrating holes 16a, 16b which penetrate the upper step portion 11c and the reinforcing plates 15a, 15b are formed. The wires 7a, 7b are passed into the penetrating holes 16a, 16b.

Figure 4:
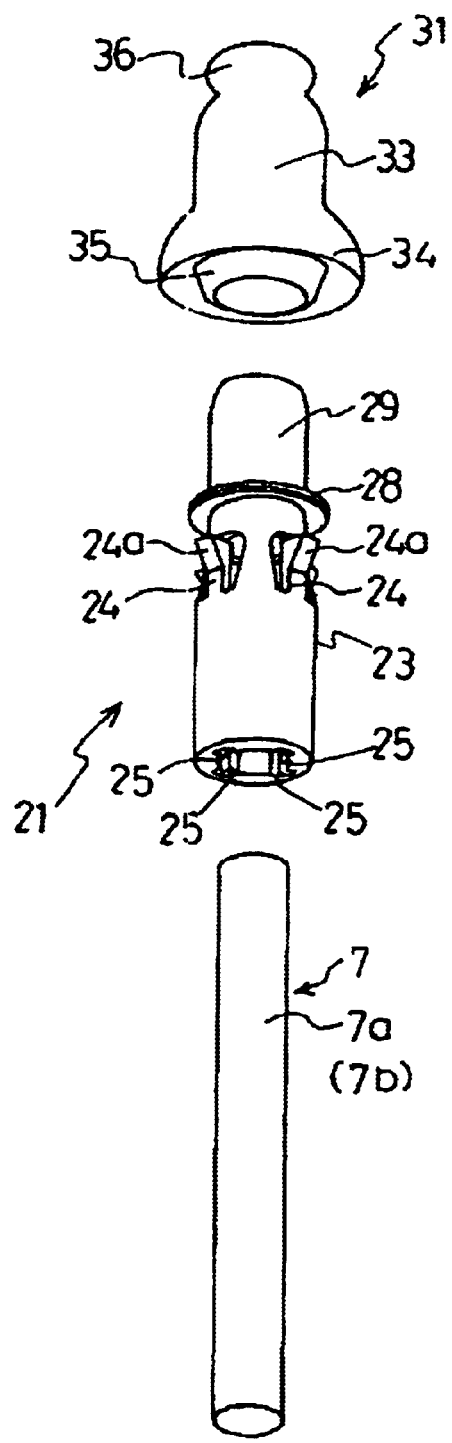
FIG. 4 is a perspective view a grommet apparatus according to an embodiment of the present invention.
Figure 5:
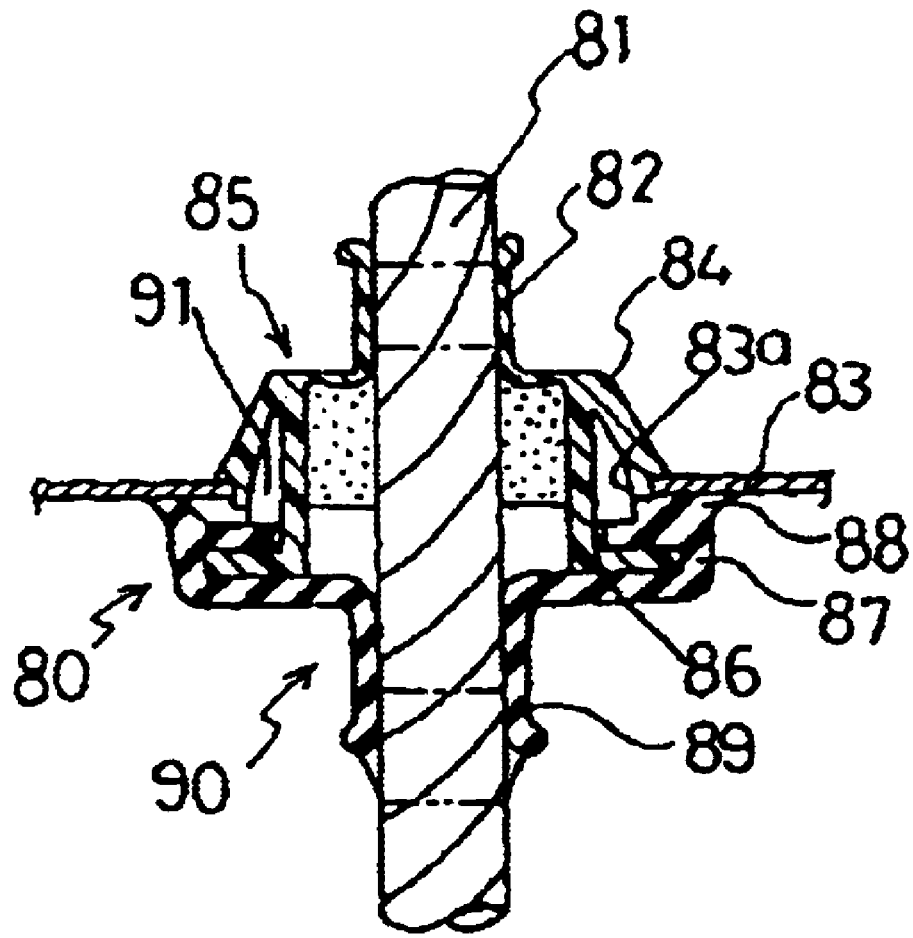
FIG. 5 is a cross-sectional view of a conventional grommet apparatus.

Next, a grommet apparatus is described. Referring to FIGS. 2 to 4, two grommet apparatuses 20 are disposed outside of the wires 7a, 7b. The upper side of the upper step portion 11c of the bracket 11 is connected to an opening portion 10a a window 10 disposed in the slide door 1. Namely, there is danger in that rain water gets in the slide door 1 from the opening portion 10a. Therefore, in order to prevent rain water from getting or invading in the circumference of the driving mechanism 6, the grommet apparatuses 20 is disposed in the penetrating holes 16a, 16b. Each of the grommet apparatus 20 includes a hard grommet 21 and a soft grommet 31, respectively. The hard grommet 21 is connected to the soft grommet 31 in a body. Further, the grommet apparatuses 20 are fitted into the penetrating holes 16a, 16b from upper side in FIG. 3 and are mounted on the bracket 11. Since two grommet apparatuses are the same structure, the grommet apparatus 20 which is disposed in the penetrating hole 16a and the wire 7a is described as follows.

The hard grommet 21 has an approximately cylindrical shape and includes a tubular wall portion 23 having a cylindrical shape. The inner surface of the tubular portion 23 contacts with the wire 7a. At an approximately central portion of the hard grommet 21 in the longitudinal direction, four claw portions 24 are formed on the outer circumference of the tubular wall portion 23 with a constant interval in the circumferential direction. The lower portion of the claw portions 24 forms a cantilever structure which is supported by the tubular wall portion 23. Engaging portions 24a which are projected outward in the radial direction are formed on the upper side of the claw portions 24, respectively. As shown in FIG. 3, the engaging portions 24a are engaged with the reinforcing plate 15a. Thus, in case that the grommet apparatus 20 is disposed at the upper step portion 11c of the bracket 11, the grommet apparatus 20 is prevented from moving upward in regard to the upper step portion 11c. In other words, the claw portions 24 engages the hard grommet 21 to the upper step portion 11c. Four groove portions 25 which extend in the longitudinal direction of the hard grommet 21 are formed on portions of the inner circumference of the tubular wall portion 23 corresponding to the claw portions 24. The groove portions 25 extend from the lower end portion of the hard grommet 21 to the neighborhood of the claw portions 24. When the grommet apparatus 20 is fitted into the penetrating hole 16a, the groove portions 25 functions as follows. Namely, the engaging portions 24a engages once with the upper stop portion 11c and the reinforcing plate 15a. At this time, the claw portions 24 bend inward in the radial direction of the hard grommet 21, and the claw portions 24 and the engaging portions 24a are moved into the groove portions 25. Thereby, the engaging portions 24a pass through the penetrating hole 16a. Namely, the grommet apparatus 20 is easily fitted into the penetrating hole 16a by the groove portions 25. Further, at the slightly upper portion from the center portion in the longitudinal direction of the hard grommet 21, a circular flange portion 28 which is extended outward in the radial direction is formed. Further, a cylindrical base portion 29 which is engaged with a soft grommet 31 is formed at the upper portion from the flange portion 28.

As shown in FIGS. 3 and 4, the soft grommet 31 has an approximately cylindrical shape. A circular groove portion 32 is formed on the inner circumference of the soft grommet 31. The groove portion 32 is engaged with the flange portion 28 and thereby the soft grommet 31 is connected to the hard grommet 21 in a body. Further, the soft grommet 31 has a cylindrical core portion (surrounding portion) 33 which is fitted onto the base portion 29 of the hard grommet 21. A seal portion (wire fitting portion) 36 whose inner diameter is smaller than that of the core portion 33 is formed on an upper end of the core portion 33. The inner diameter of the seal portion 36 is smaller than the outer diameter of the wire 7a and is expanded by the insert of the wire 7a. Thus, the seal portion 36 is fluid-tightly contacted with the wire 7a. Further, at the lower side of the core portion 33, a circular seal portion (first seal portion) 34 which extends outward in the radial direction of the soft grommet 22 is formed. As shown in FIG. 4, in case that the grommet apparatus 20 is not disposed on the upper step portion 11c of the bracket 11, the seal member 34 is flagging downward in FIG. 4. As shown in FIG. 3, in case of that the grommet apparatus 20 is disposed on the upper step portion 11c, the seal portion 34 is engaged with the upper step portion 11c of the bracket 11 and the inner diameter thereof is expanded outward in the radial direction. In this case, the seal member 34 is urged in such a manner that the outer top end the seal me member 34 in the radial direction is fluid-tightly engaged with the upper step portion 11c. Further, at the opposite side of the core portion 33, a cylindrical seal portion (second seal portion) 35 whose inner diameter is the same as that of the core portion 33 is formed. The thickness of the seal portion 35 gets thinner downward in FIG. 4. In case that the grommet apparatus 20 is inserted into the penetrating hole 16a from the upper side in FIG. 3, the seal portion 35 is pressed so as to fill up the gap between the penetrating hole 16a and the hard grommet 21.

Next, the operation of the power slide mechanism is described. When the door opening 21 is closed (the slide door 1 coincides with the opening 21 in FIG. 1) and the output drum 62 is rotated in one direction by the normal rotation of the motor, the inner cable 71*a* is reeled off by the output drum 62 and the inner cable 71*b* is discharged from the output drum 62. Since the inner cables 71*a*, 71*b* are connected to the vehicular body at the other ends thereof, the movable pulley mechanism 8 is moved backward of the vehicle along the center guide rail 3*a*. At this time, the guide roller unit 5 which is connected to the movable pulley mechanism 8 slides in the center guide rail 3*a*. As a result, the slide door 1 is opened. The movement of the slide door 1 from the opened condition to the closed condition is performed by the reverse rotation of the motor 61.

In the above operation, the inner cables 71*a*, 71*b* are slide in the casings, 72*a*, 72*b*. On the other hand, as shown in FIG. 1, the driving mechanism 6 and the intermediate pulley mechanism 9 is disposed at the position which is offset in the back and forth direction. The driving mechanism 6 and the intermediate pulley mechanism 9 is disposed at the position which is offset in the width direction of the vehicle. As mentioned above, in case that the inner cables 7*a*, 7*b* are slide in the casings 72*a*, 72*b*, as shown in FIG. 3, the wires 7*a*, 7*b* swings in regard to the upper step portion 11*c*. At this time, the grommet apparatus 20 moves also with the wires 7*a*, 7*b*. However, since the seal member 35 is filled up to the gap between the penetrating hole 16*a* and the hard grommet 21, the swing and the saccadic movement of the grommet apparatus 20 in regard to the upper step portion 11*c* is decreased.

Accordingly, the sealing performance of the grommet apparatus 20 in regard to the upper step portion is increased. Further, the decrease of the swing and the saccadic movement of the grommet apparatus 20 prevent the grommet apparatus from hitting to the penetrating holes 16*a*, 16*b* and therefore the durability of the grommet apparatus 20 is improved.

As mentioned above, according to the present invention, the saccadic movement of the grommet apparatus 20 can be prevented and the sealing performance of the grommet apparatus can be improved.

What is claimed is:

1. A grommet apparatus comprising:

a wire, a hard grommet having a tubular wall portion contacted with the wire, a base portion contacted with the wire and a flexible engaging portion formed on the tubular wall portion and engaged with an opening, and a soft grommet having a surrounding portion surrounding the hard grommet, a first seal portion extended from the surrounding portion and fluid-tightly contacted with a surface of the panel, a wire fitting portion fitted onto the wire and a second seal portion fitted between the opening and the hard grommet.

* * * * *